(12) United States Patent
Nogaret et al.

(10) Patent No.: US 9,139,152 B2
(45) Date of Patent: Sep. 22, 2015

(54) INTERIOR PANEL COMPONENT WITH INSERT FOR AN AIRBAG COVERING AND METHOD FOR PRODUCING THE INTERIOR PANEL COMPONENT

(71) Applicant: SMP Deutschland GmbH, Boetzingen (DE)

(72) Inventors: Eric Nogaret, Biesheim (FR); Uwe Luesebrink, Freiburg (DE)

(73) Assignee: SMP DEUTSCHLAND GMBH, Boetzingen (DE)

( * ) Notice: Subject to any disclaimer, the term of this patent is extended or adjusted under 35 U.S.C. 154(b) by 0 days.

(21) Appl. No.: 13/973,730

(22) Filed: Aug. 22, 2013

(65) Prior Publication Data

US 2014/0054878 A1    Feb. 27, 2014

(30) Foreign Application Priority Data

Aug. 27, 2012   (EP) .................................... 12181919

(51) Int. Cl.
*B60R 21/215* (2011.01)
*B29D 22/02* (2006.01)

(52) U.S. Cl.
CPC .............. *B60R 21/215* (2013.01); *B29D 22/02* (2013.01); *B60R 2021/21537* (2013.01)

(58) Field of Classification Search
CPC ................... B60R 21/215; B60R 2021/2178; B60R 2021/2177
USPC ............................................... 280/728.3, 732
See application file for complete search history.

(56) References Cited

U.S. PATENT DOCUMENTS

| | | | |
|---|---|---|---|
| 5,427,408 A * | 6/1995 | Ando et al. | 280/728.3 |
| 7,234,726 B2 * | 6/2007 | Trevino et al. | 280/728.3 |
| 7,290,790 B2 * | 11/2007 | Kielinen | 280/728.2 |
| 7,744,115 B2 * | 6/2010 | Kanno | 280/728.3 |
| 7,992,890 B2 | 8/2011 | Nogaret | |
| 8,336,907 B2 | 12/2012 | Nogaret | |
| 8,336,908 B1 * | 12/2012 | Kalisz et al. | 280/728.3 |
| 8,403,357 B2 * | 3/2013 | Choi | 280/728.2 |
| 8,474,861 B1 * | 7/2013 | Twork | 280/728.3 |
| 2002/0135161 A1 * | 9/2002 | Lamb et al. | 280/728.3 |
| 2004/0124617 A1 * | 7/2004 | Morita | 280/732 |
| 2005/0269804 A1 * | 12/2005 | Yamada et al. | 280/728.3 |
| 2006/0186649 A1 * | 8/2006 | Izumi et al. | 280/732 |
| 2009/0026740 A1 * | 1/2009 | Dorn | 280/728.3 |
| 2009/0218792 A1 * | 9/2009 | Nogaret et al. | 280/728.3 |
| 2011/0241316 A1 * | 10/2011 | Sauer et al. | 280/728.3 |
| 2013/0134693 A1 * | 5/2013 | Tromp | 280/728.3 |
| 2014/0117649 A1 * | 5/2014 | Hoeing et al. | 280/728.3 |

FOREIGN PATENT DOCUMENTS

| | | | |
|---|---|---|---|
| DE | 102004020913 B3 | 9/2005 | |
| DE | 102007038055 | 5/2009 | |

(Continued)

*Primary Examiner* — James English
(74) *Attorney, Agent, or Firm* — Ursula B. Day; Law Firm of Ursula B. Day

(57) ABSTRACT

An interior paneling component for motor vehicles is disclosed which includes a structural part with a deployment channel for a covering for an airbag, which upon deployment is expelled in a deployment direction through the deployment channel from the interior paneling component. The airbag covering is at least in part reinforced with an insert made from a thermoplastic material. The insert and the structural part are at least partially made from thermoplastic material in the same family plastics. The invention also refers to a method of producing such an interior paneling component.

15 Claims, 5 Drawing Sheets

(56) References Cited

FOREIGN PATENT DOCUMENTS

| | | |
|---|---|---|
| DE | 102012015253 | 2/2014 |
| EP | 0743229 A1 | 11/1996 |
| EP | 2178723 B1 | 9/2005 |
| WO | WO 2010/063333 A1 | 6/2009 |

* cited by examiner

INTERIOR PANEL COMPONENT WITH INSERT FOR AN AIRBAG COVERING AND METHOD FOR PRODUCING THE INTERIOR PANEL COMPONENT

CROSS-REFERENCES TO RELATED APPLICATIONS

This application claims the priority of European Patent Application Serial No. 12 181 919.7, filed Aug. 27, 2013, pursuant to 35 U.S.C. 119(a)-(d), the subject matter of which is incorporated herein by reference.

BACKGROUND OF THE INVENTION

The invention refers to an interior paneling component including a structural component with a deployment channel for an airbag to be deployed, and an airbag covering which is reinforced at the side facing the airbag at least in some portions with an insert. The invention also refers to a method of producing the interior panel component.

From EP 2 178 723 a structural part with an integrated airbag covering for the interior paneling of an automotive vehicle is known. The airbag covering includes an airbag cover plate as reinforcement and splinter protector. The airbag cover plate is formed into the structural part of the airbag covering during the forming process. The air bag cover plate can be made from a reinforced or deep drawn plastic shaped for absorbing shrinking and heat stresses during the forming process.

Furthermore, from the WO 2010/06333 A1, an interior panel component with a deployment channel cover and deployment channel module for an air bag is known. The deployment channel and the deployment channel cover includes a plastic coated textile fabric with a hinge function. A lifting loop facilitates pressing out the airbag covering from the level of the dash board by the unfolding air bag. According to WO 2010/06333 A1, the textile fabric must be anchored by means of a deflector, in order to avoid ripping the textile fabric upon the explosive opening of the air bag.

Classic fabrics or textiles rarely exhibit shape stability thus limiting their utility as an insert in forming processes. Commercial plastic textile fabrics for hinge functions and functions of splinter protection must be mechanically fastened, for example at place holders in the injection mold.

Lifting loops, known in the prior art, that correspond for example with the thickness of a decorating layer, must be kept free of material during the forming process.

It would therefore be desirable and advantageous to provide an improved air bag cover to obviate prior art shortcomings and to produce air bag coverings that are easy to produce from suitable material and that are rendering security to passengers.

SUMMARY OF THE INVENTION

According to one aspect of the present invention, an interior paneling component is provided which includes a structural part with a deployment channel for the airbag to be deployed and an airbag covering. The air bag covering facing the airbag is at least partially reinforced with an insert. The insert is at least in part made from a thermoplastic material and the insert as well as the structural part both, are made from the same family of thermoplastic material.

According to another aspect of the present invention, a method is provided by which to produce the interior paneling component which includes that the structural part and the insert are together injection molded.

The present invention resolves prior art problems by providing an interior paneling component that includes a structural part having a deployment channel and a covering for the airbag deployable in a deployment direction through the deployment channel and emerging from the interior paneling component. At the side of the air bag covering facing the air bag, an insert reinforces the covering. According to the present invention, the insert is at least partially made from a thermoplastic material. Both, the insert and the structural part are made from the same thermoplastic material.

According to another aspect of the present invention, the insert is a self-stabilized form part which can be placed into the injection mold by automatic means and without the need for mechanical fastening where it undergoes forming through a thermal forming process.

The structural part and the insert are fashioned form compatible material and fulfill together as a composite the function for a normal air bag deployment. Material compatibility ensures a bonded connection, for example, a fabric in the insert with the structural part acting as a support. This functional and material integration provides a considerable cost advantage and results in a welcome weight reduction as compared to the conventional metal plate reinforcements, so that due to a decreased mass inertia the air bag can deploy more rapidly.

Advantageously, the fiber reinforcement supports the required splinter protection without requiring a complex construction for anchoring a textile fabric and upon the explosive deployment of the air bag, the chemical composite holds the insert securely and completely bonded to the structural part.

The interior paneling component of the present invention may include air bag coverings that are formed in one piece or in multiple parts and are thus particularly suitable for air bag coverings in the paneling of the dash board, the lateral paneling and especially also in the narrow areas of the columns of motor vehicles. In addition, the interior paneling component can be utilized in all common dash board formations, for example those that are grained, laminated and/or foamed.

Simple configuration of the insert also allows the introduction of defined hinge lines that are carried out during the injection molding process of the present invention, by means of tool sliders that are moved passed the insert.

In a further advantageous embodiment of the interior paneling component according to the present invention, the thermoplastic material for producing the insert is polypropylene. With this type of plastic the structural part and the insert can be produced with the desired quality and in a cost-effective manner.

In a further advantageous embodiment of the interior paneling component, the insert is produced with fiber reinforcement, where the reinforcement is particularly from woven textiles, textile fabric or knitted fabric. The fiber reinforcement stabilizes the insert against fracturing.

According to a further advantageous embodiment of the interior paneling component of the present invention, fibers and/or endless fibers such as: glass-, aramide-polypropylene-, jute- and/or carbon fibers reinforce, at least in part, the plastic material of the insert.

According to a further advantageous embodiment of the interior paneling component of the present invention, the insert includes a cover wall arranged perpendicular to the direction of the deployment path of the air bag, and side walls oriented along the direction of the deployment path. Particularly advantageous is a rear wall connected with the cover wall in a hinged manner.

The walls of the insert oriented in direction of the deployment path of the air bag, in a composite with the structural part of the present invention, act as a fastening segment which prevents that the walls are exposed to forces that normally can lead to the delamination of the insert. Instead, the insert is securely embedded in the structural part, especially in the deployment channel.

According to a further advantageous embodiment of the interior paneling component of the present invention, the insert is provided with at least one lifting loop. It is especially advantageous when the lifting loop is disposed facing an outlet end of the deployment channel. The lifting loop has a defined length and, according to the present invention, is already placed in the insert during the textile fabric forming process thereby supporting a defined hinge line. The lifting loop permits the covering to first emerge in deployment direction before the covering is actually opened yet.

According to a further advantageous embodiment of the interior paneling component of the present invention, the forming process renders the insert reinforced and flat formed with an evenly thick or dense fiber-fabric, textile and/or knitted fabric, in particular also in the area of the lifting loop. Thus, the hinge area of the insert functions for any thickness of a decoration layer on the interior paneling component.

According to a further advantageous embodiment of the interior paneling component, the fiber-fabric, textile and/or knitted fabric is folded twice to form the lifting loop resulting locally in three parallel overlapping layers.

According to a further advantageous embodiment of the interior paneling component, a tear line is made in the insert extending parallel to at least one hinge element, especially centrally between two lifting loops to form either a U-shaped or an H-shaped flap.

According to a further advantageous embodiment of the interior paneling component, the tear line is made in the insert by laser cutting at the side facing the air bag. Such a tear line affords the timely and secure opening of the air bag, appropriately after the lifting loop has emerged through the insert without any splintering which could tear into the air bag.

According to a further advantageous embodiment of the interior paneling component, the insert is integrated at least partially in the deployment channel, in particular in an end segment, for example, the rear wall oriented parallel to a wall of the deployment channel and is bearing against that wall.

In an advantageous method of the present invention for producing the interior paneling component, the molded deployment channel is locally textile reinforced and thus secured against fracturing.

According to the method of the present invention for producing the interior paneling component, the structural part and the insert are injection molded together. According to the method of the present invention, the insert is placed into the injection mold and positioned therein by automatic means.

According to an advantageous embodiment of the method of the present invention for producing the insert, at least the following method steps are carried out in sequence:
  pre-forming the insert, especially with the cover wall, rear wall, side walls and/or at least one lifting loop;
  placing the insert on a place holder for the air bag;
  closing the mold,
  injection molding the structural part, whereby the injected plastic material reaches the insert at least in part, in particular, at least is coated on one side, so that the same plastic material can form the chemical bonds.

A forming of the insert with thermoplastic material during the preforming step allows placing the insert into the injection mold by automatic means.

According to a further advantageous embodiment of the method of the present invention, either before, during or after the injection molding process, a strip is moved into the area on one side of the place holder for the airbag which is reserved for placement of the structural part. The simple configuration of the insert allows to provide defined hinge lines that are placed by means of a tool slider moving past the insert during such an injection molding process.

According to yet another advantageous embodiment of the method of the present invention, following the injection molding, a tear line is made in the interior paneling component at the airbag side of the interior paneling component, in particular, the tear line is made in the insert at the side facing the airbag for the formation of a U-flap or an H-flap. It is especially preferred making the tear line by laser cutting which extends parallel to one of the lifting loops and/or centrally between the two lifting loops.

The invention is further described below illustrated by three embodiments shown in the drawings.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
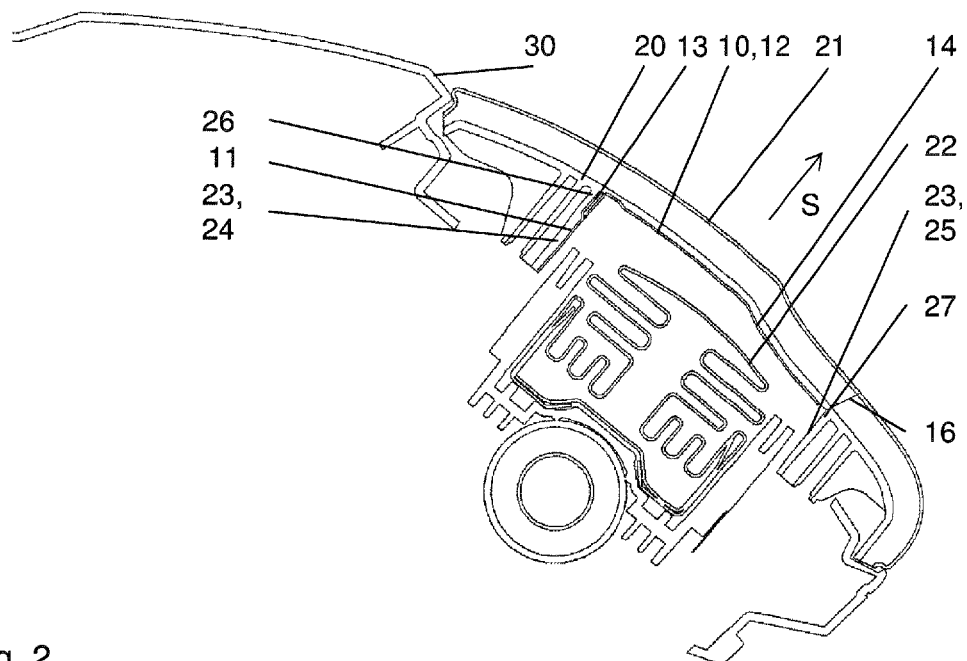
FIG. 1 is a schematic illustration of a section through a first embodiment of the interior paneling component according to the present invention.

Throughout all the Figures, same or corresponding elements are generally indicated by same reference numerals.

Turning now to the drawing, and in particular to FIGS. 1 and 3-7, there is shown a first embodiment of the interior paneling component according to the present invention. The interior paneling 30 has a relatively thick covering 21 for an air bag 22 in a motor vehicle with a back-foamed, so-called slush skin. The air bag can be expelled along a deployment path S through an opened covering 21', with the expelled air bag 22' shown in FIG. 7. At first, the airbag 22 is folded away underneath the covering 21 which is configured as a U-flap.

The air bag 22 facing toward the vehicle interior is covered with structural part 20 facing the air bag 22 and is reinforced with insert 10.

Upon deployment, air bag 22 is explosively expelled through the deployment channel 23 into the vehicle interior. Due to this action, the structural part 20 includes walls 24, 25 oriented alongside the direction of deployment channel S having outlet ends 26, 27.

The insert 10, includes a cover wall 12 having a curve 14 adapted to the outer contour of the structural part 20, and extends substantially perpendicular to the deployment path S. At the outer edges of the cover wall 12 of the substantially perpendicular cover wall 12, a rear wall 11 and a side wall 17 extend roughly perpendicular and oriented in opposite direction of the deployment path S.

The insert 10, is connected to the structural part 20 where at least the rear wall 11, at a first of the outlet ends 26 overlaps with the structural part 20 to thereby realize a material joint due to the material compatibility.

Figure 3:
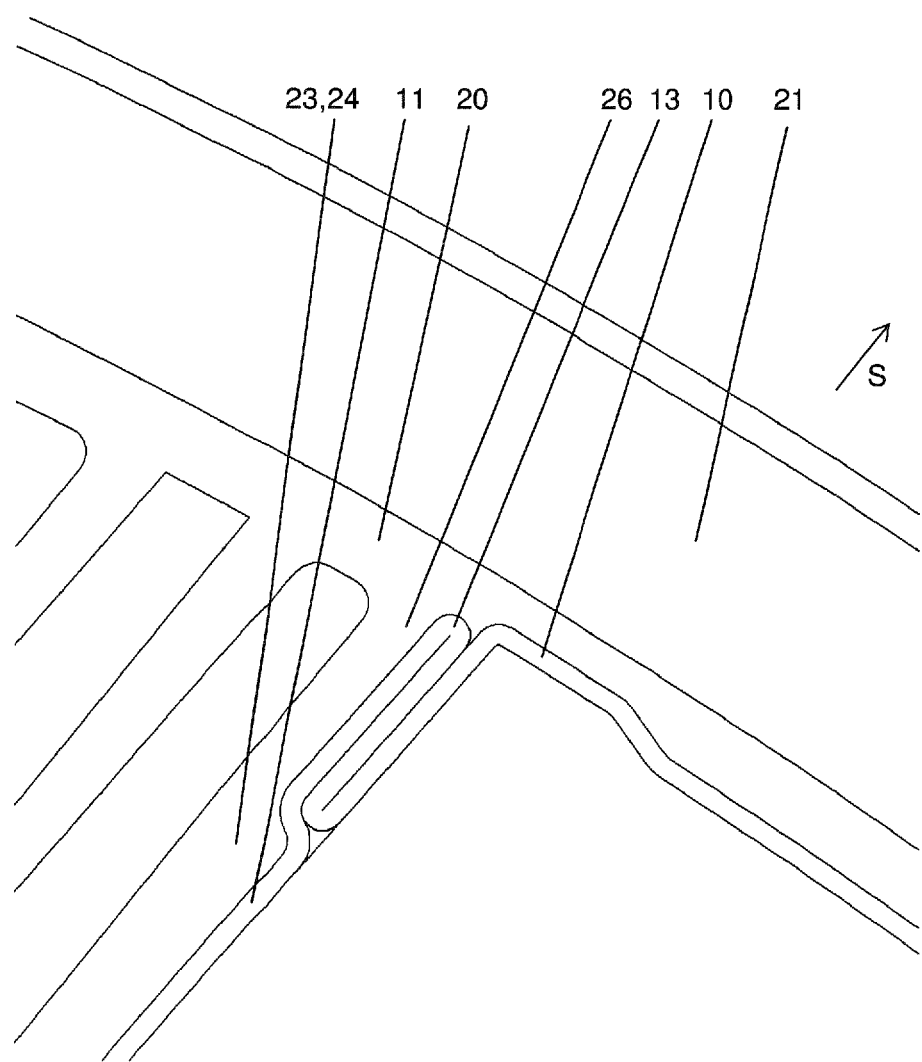
FIG. 3 is an enlarged detail of a section according to FIG. 1 or 2 around the lifting loop.

The insert 10 includes at one side of the deployment channel 23, as seen at the left side of FIG. 1, a lifting loop 13 facing outlet end 26. Lifting loop 13 consist of a double folded textile to realize an emergence of the U-flap before the flap actually opens. This temporal sequence is realized through material thickness as well as the tear lines 16 in the structural part 20 that are coordinated and interfacing for that purpose. Thus, upward of the lifting loop, the thickness of the structural part is reduced (FIG. 3).

Figure 4:
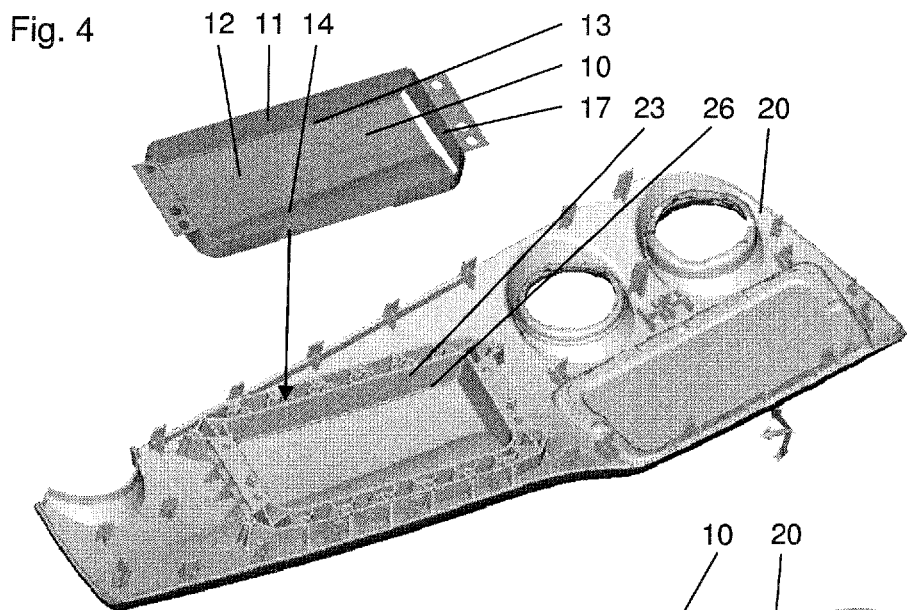
FIG. 4 is a bottom perspective view of the structural part of the interior paneling component, and showing the insert and the positioning of the insert in an exploded view.
Figure 5:
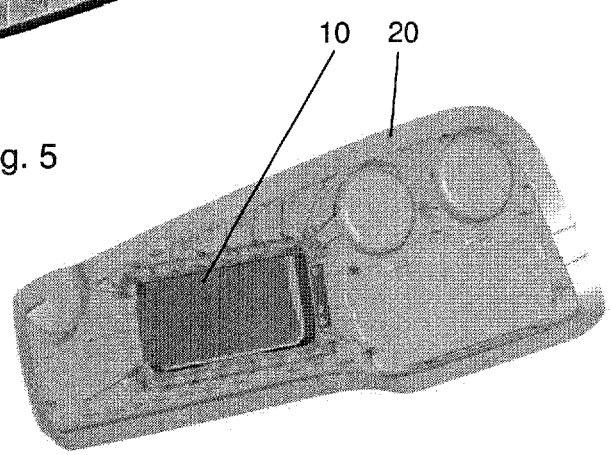
FIG. 5 is a perspective view of the structural part of FIG. 4 with the insert in place.
Figure 6:
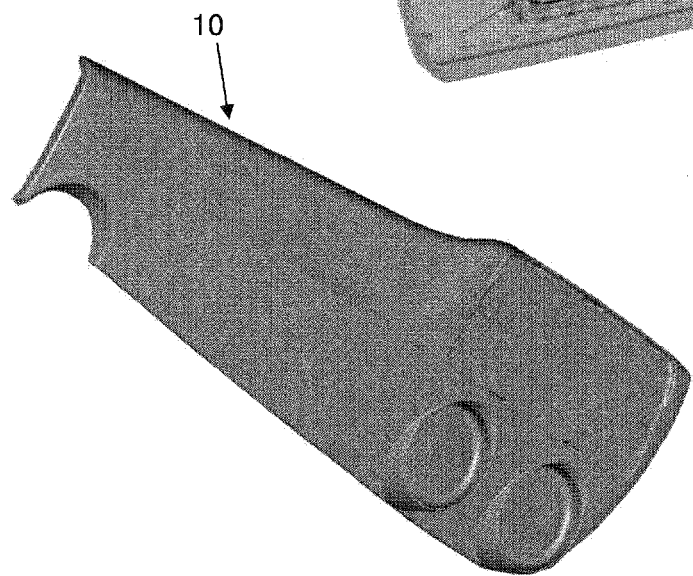
FIG. 6 is a perspective view of the structural part according to FIG. 5 in a top view where the insert is not seen.
Figure 7:
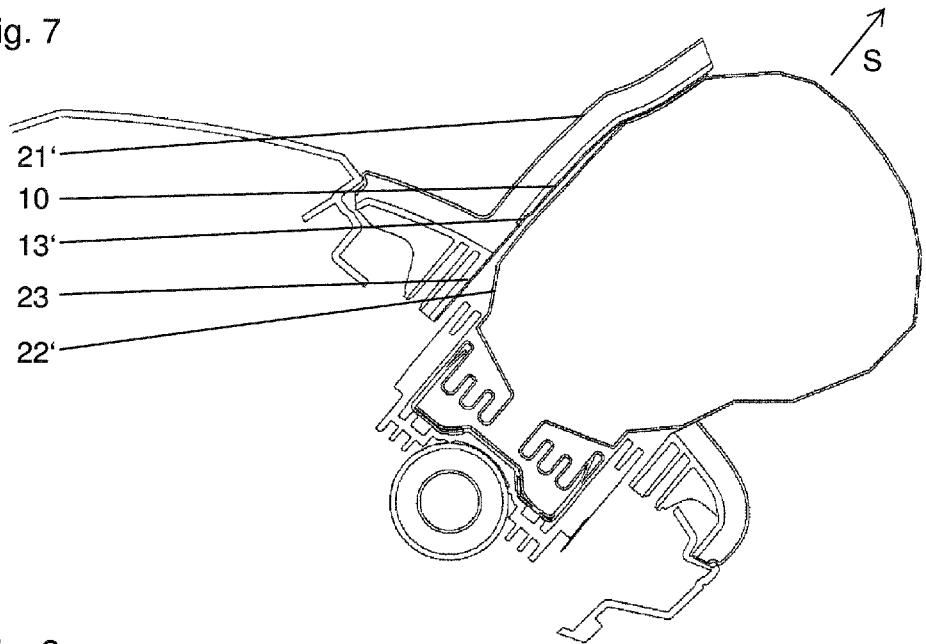
FIG. 7 is a schematic view of a section through the first embodiment according to FIG. 1 with an opened U-flap and the expelled airbag.
Figure 9:
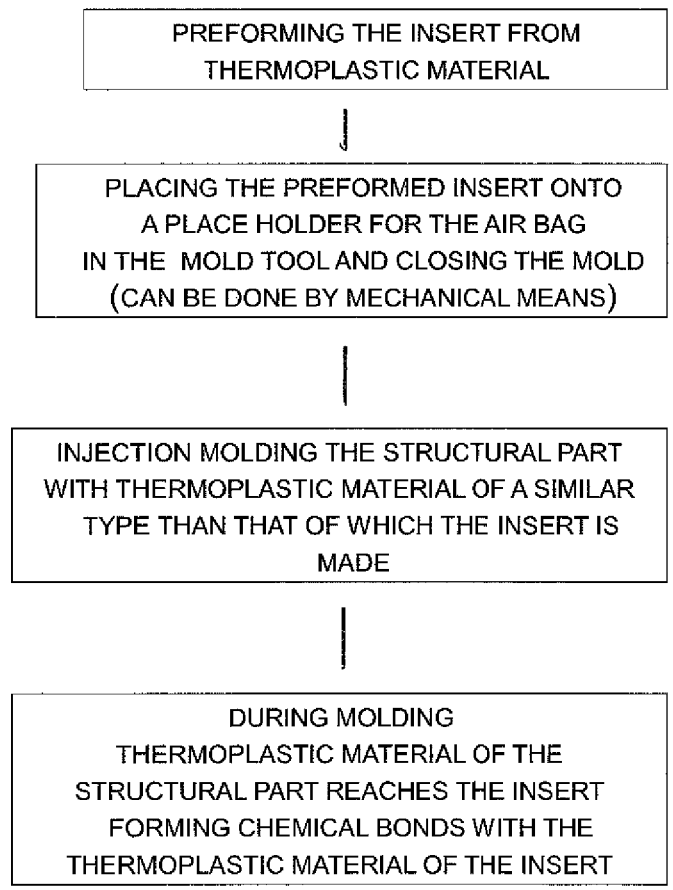
FIG. 9 is a flow diagram to illustrate the general flow of producing the interior paneling component of the present invention.

FIGS. 4 and 5 in particular illustrate the placement of the insert 10 into the structural part 20. However, according to the method of the present invention, the insert 10, after the forming process, is placed on a place holder, for the air bag 22, not shown here, and subsequently the structural part 20 molded around the insert 10 at least on one side (FIG. 9). The tear line 16 is finally lasered from the inside into the structural part 20 and if needed also through the insert 10.

Figure 2:
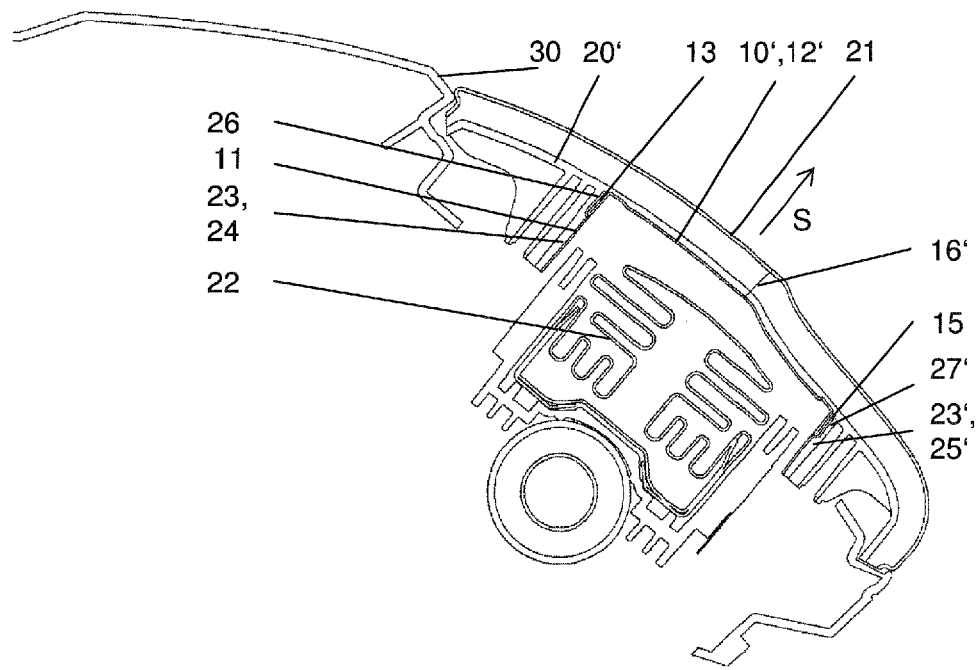
FIG. 2 is schematic illustration of a section through a second embodiment according to the present invention with an insert and two lifting loops (H-flap).

A second embodiment of the interior paneling component of the present invention is shown in FIG. 2. Parts that have reference numerals of essentially same parts are shown with the prime sign ('). In the second embodiment an H-flap is formed. At each side of the deployment channel 23', the insert 10' exhibits a first lifting loop 13 and a second lifting loop 15. Approximately centrally between the lifting loops and following the deployment path S extends the tear line 16'. In case the air bag 22 is deployed, two flaps are opening frontwardly, after the lifting loops 13 and 15 have emerged and the insert 10' and the structural part 20' are torn along the tear line 16'.

Figure 8:
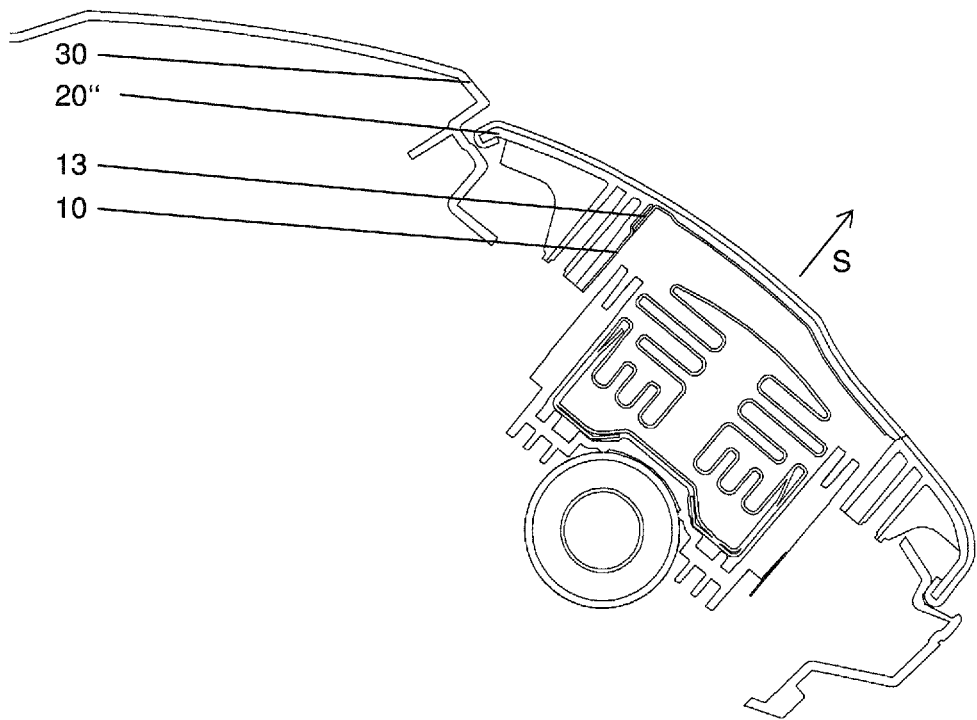
FIG. 8 is a schematic illustration of a section through a third embodiment of the interior paneling component according to the present invention shown laminated without foam and the insert with a lifting loop (U-flap).

A third embodiment of the interior paneling component of the present invention is shown in FIG. 8. The interior paneling component is laminated without being foamed and is thus correspondingly thinner. The opening of this thin structural part 22' as a covering for the air bag then follows the principle of the U-flap analog FIGS. 1 and 3-7.

While the invention has been illustrated and described as embodied in an air bag covering, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An interior paneling component comprising:
    a structural part and a deployment channel for an air bag to be deployed,
    an air bag covering, and
    an insert, wherein said air bag covering is reinforced at a side facing the air bag at least in part with the insert, said insert is at least in part made of a thermoplastic material and the insert and the structural part are both made from a same type of thermoplastic material, wherein the insert is connected to the structural part with at least a rear wall of the insert that overlaps at a first one of outlet ends of the deployment channel with the structural part whereby a material joint with the structural part is realized.

2. The interior paneling component of claim 1, wherein the thermoplastic material for the insert is polypropylene.

3. The interior paneling component of claim 1, wherein the insert is fiber reinforced, with a fibrous textile, a knitted fabric or a woven fabric.

4. The interior paneling component of claim 2, wherein the thermoplastic material for the insert is at least partially reinforced with one or more elements selected from the group consisting of glass, aramide, poly propylene, jute, and coal fibers.

5. The interior paneling component of claim 1, wherein the insert includes a cover wall disposed perpendicular to a deployment direction of the air bag and side walls oriented along the deployment direction and the rear wall which is connected to the cover wall in hinged manner.

6. The interior paneling component of claim 1, wherein the insert further includes at least one lifting loop facing the outlet end of the deployment channel.

7. The interior paneling component of claim 6, wherein the insert, in the area of the lifting loop is formed with a flat reinforcing element of fibrous tissue, textile fabric or woven fabric that are of an even thickness.

8. The interior paneling component of claim 6, wherein said lifting loop is formed with twice folded fibrous fabrics, tissues or knitted fabrics which represents three parallel stacked layers.

9. The interior paneling component of claim 1, wherein the insert includes a tear line extending parallel to at least one hinge element or centrally between two lifting loops for forming a U-shaped flap or an H-shaped flap.

10. The interior paneling component of claim 9, wherein the tear line of the side facing the air bag is at least produced in the insert by laser cutting.

11. The interior paneling component of claim 5, wherein the insert is at least in part integrated into the deployment channel at an outlet end of the rear wall, and bearing at a wall oriented parallel to the deployment direction of the air bag.

12. A method of producing an interior paneling component comprising injection molding a structural part of the interior paneling component together with an insert wherein at least the following steps are in sequence:
    preforming the insert with a cover wall, rear wall, side wall from a thermoplastic material and providing at least one lifting loop,
    placing the insert onto a place holder for the air bag in the mold,
    closing the mold,
    injection molding the structural part with a thermoplastic material, wherein the injected plastic reaches the insert at least in part, so that the thermoplastic material of the insert and the structural part are forming chemical bonds.

13. The method of claim 12, wherein the insert is molded at least at one side with the injected plastic.

14. The method of claim 12, further comprising the step of moving a strip before, during or after the molding process, into an area on one side of a place holder for the air bag reserved for placement of the structural part.

15. The method of claim 13, subsequent to the injection molding step, further comprising the step of laser cutting a tear line in the insert of the interior paneling component at the air bag side, thereby delineating a U-shaped flap by cutting parallel to the lifting loop or an H-shaped flap by cutting centrally between two of said lifting loop.

* * * * *